US007822718B1

(12) United States Patent
Wilson et al.

(10) Patent No.: US 7,822,718 B1
(45) Date of Patent: Oct. 26, 2010

(54) RESTORATION OF ARCHIVED CONFIGURATIONS FOR A NETWORK DEVICE

(75) Inventors: Reid E. Wilson, Cary, NC (US); Philip A. Shafer, Raleigh, NC (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

(21) Appl. No.: 12/427,468

(22) Filed: Apr. 21, 2009

Related U.S. Application Data

(63) Continuation of application No. 10/756,960, filed on Jan. 13, 2004, now Pat. No. 7,523,097.

(51) Int. Cl.
*G06F 17/30* (2006.01)

(52) U.S. Cl. .................. 707/684; 707/804; 707/808; 707/703; 707/704; 709/230; 709/220

(58) Field of Classification Search ............. 707/804, 707/808, 697, 674, 680, 684, 703, 704; 709/230
See application file for complete search history.

(56) References Cited

U.S. PATENT DOCUMENTS

| | | | |
|---|---|---|---|
| 5,497,316 A | 3/1996 | Sierk et al. | |
| 5,517,646 A | 5/1996 | Piccirillo et al. | |
| 5,600,262 A | 2/1997 | Kolze | |
| 5,835,501 A | 11/1998 | Dalmia et al. | |
| 5,835,601 A | 11/1998 | Shimbo et al. | |
| 5,887,151 A | 3/1999 | Raz et al. | |
| 6,003,075 A | 12/1999 | Arendt et al. | |
| 6,014,669 A | 1/2000 | Slaughter et al. | |
| 6,014,699 A | 1/2000 | Ratcliff et al. | |
| 6,240,511 B1 * | 5/2001 | Blumenau et al. ............. 713/1 |
| 6,393,419 B1 | 5/2002 | Novak et al. | |
| 6,587,124 B1 | 7/2003 | Slaby | |
| 6,671,669 B1 | 12/2003 | Garudadri et al. | |
| 6,671,699 B1 | 12/2003 | Black et al. | |
| 6,826,715 B1 * | 11/2004 | Meyer et al. .................. 714/37 |
| 6,895,414 B2 * | 5/2005 | Ford et al. ........................ 1/1 |
| 6,901,580 B2 | 5/2005 | Iwanojko et al. | |
| 7,000,161 B1 | 2/2006 | Allen et al. | |
| 7,039,050 B1 | 5/2006 | Mutreja | |

(Continued)

OTHER PUBLICATIONS

U.S. Appl. No. 10/223,813, entitled "Private Configuration of Network Devices," filed Aug. 19, 2002, by Simon J. Gerraty et al.

(Continued)

*Primary Examiner*—John R. Cottingham
*Assistant Examiner*—Sherief Badawi
(74) *Attorney, Agent, or Firm*—Shumaker & Sieffert, P.A.

(57) ABSTRACT

Techniques are described for reliable restoration of archived configuration. For example, a device, such as a router, comprises a first memory to store operational configuration data and a second memory to store candidate configuration data. The candidate configuration data represents a working copy of the operational configuration data. The device further includes a control unit to lock the candidate configuration data, load archived configuration data to replace the locked candidate configuration data and commit the candidate configuration data to restore the archived configuration data as the operational configuration data of the device. In locking the candidate configuration, the device ensures reliable restoration of the candidate configuration by helping prevent the device from becoming both unreachable and inoperable.

13 Claims, 8 Drawing Sheets

U.S. PATENT DOCUMENTS

| | | |
|---|---|---|
| 7,055,148 B2 | 5/2006 | Marsh et al. |
| 7,206,805 B1 * | 4/2007 | McLaughlin, Jr. .......... 709/203 |
| 7,233,975 B1 * | 6/2007 | Gerraty et al. .............. 709/213 |
| 7,290,056 B1 * | 10/2007 | McLaughlin, Jr. .......... 709/230 |
| 7,307,979 B2 * | 12/2007 | Visser ........................ 370/351 |
| 7,395,420 B2 * | 7/2008 | Rothman et al. ............... 713/1 |
| 7,454,483 B2 * | 11/2008 | Soluk et al. ................. 709/220 |
| 7,457,830 B1 | 11/2008 | Coulter et al. |
| 7,512,849 B1 * | 3/2009 | Allen et al. ................. 714/725 |
| 7,640,317 B2 * | 12/2009 | Jain et al. ................... 709/213 |
| 2001/0039519 A1 | 11/2001 | Richards |
| 2002/0161860 A1 | 10/2002 | Godlin et al. |
| 2002/0162049 A1 | 10/2002 | Takamoto et al. |
| 2003/0070063 A1 * | 4/2003 | Boyle et al. .................... 713/2 |
| 2003/0101059 A1 | 5/2003 | Heyman |
| 2003/0149755 A1 | 8/2003 | Sadot |
| 2003/0212983 A1 | 11/2003 | Tinker |
| 2004/0139179 A1 | 7/2004 | Beyda |
| 2005/0015471 A1 | 1/2005 | Zhang et al. |
| 2005/0086384 A1 | 4/2005 | Ernst |
| 2005/0114315 A1 * | 5/2005 | Tanner et al. .................. 707/3 |
| 2005/0138375 A1 | 6/2005 | Sadjadi |
| 2006/0007944 A1 | 1/2006 | Movassaghi et al. |
| 2006/0031427 A1 | 2/2006 | Jain et al. |
| 2006/0167878 A1 | 7/2006 | Hartman |

OTHER PUBLICATIONS

U.S. Appl. No. 10/392,201, entitled "Application of a Configuration Patch to a Network Device," filed Mar. 17, 2003, by Philip A. Shafer.

U.S. Appl. No. 10/339,719, entitled "Generation of a Configuration Patch for Network Devices," filed Jan. 9, 2003, by Simon J. Gerraty et al.

U.S. Appl. No. 10/756,960, entitled "Restoration of Archived Configurations for a Network Device," filed Jan. 13, 2004, by Reid E. Wilson et al.

* cited by examiner

RESTORATION OF ARCHIVED CONFIGURATIONS FOR A NETWORK DEVICE

CROSS REFERENCE TO RELATED APPLICATIONS

This application is a continuation of U.S. application Ser. No. 10/756,960, filed Jan. 13, 2004, the entire content of which is incorporated herein by reference.

TECHNICAL FIELD

The invention relates to computer networks, and more particularly, to configuring devices within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Certain devices within the network, referred to as routers, maintain tables of routing information that describe available routes through the network. Each route defines a path between two locations on the network. Upon receiving an incoming data packet, the router examines header information within the packet to identify the destination for the packet. Based on the header information, the router accesses the routing table, selects an appropriate route for the packet and forwards the packet accordingly.

Conventional routers typically include a mechanism, referred to herein as a management interface, for locally or remotely configuring the router. By interacting with the management interface, various clients, such as human users and automated scripts, can perform configuration tasks. For example, the clients may configure interface cards of the router, adjust parameters for the supported network protocols, specify the physical components within the routing device, modify the routing information maintained by the router, access software modules and other resources residing on the router, and perform other configuration tasks.

In some routers, the management interface allows a client to configure the present operational configuration of the router using a commit-based model. In a commit-based model, a client issues one or more configuration commands, and then directs the management interface to apply the commands by issuing a "commit" command. The client may further direct the management interface to disregard the commands by issuing a "rollback" command. Typically, the management interface maintains a copy of the operational configuration, i.e., a candidate configuration, to which the management interface applies the one or more configuration commands. Upon receiving a commit command, the changes made to the candidate configuration transfer to the operational configuration. A rollback command causes the management interface to replace the candidate configuration with a new copy of the operational configuration, thereby removing any changes to the candidate configuration made by the configuration commands.

The management interface, in some routers, also allows a client to archive the operational configuration of the router. Furthermore, the management interface allows a client to restore an archived configuration causing the archived configuration to become the operational configuration. Typically, when restoring an archived configuration, the archived configuration is first restored as the candidate configuration. Subsequently, the management interface issues the commit command to cause the configuration differences between the archived configuration and the operational configuration to transfer to the operational configuration, thereby effectively replacing the operational configuration with the candidate configuration.

As the complexity of computing networks has increased, there has been an increasing need for routers and other network devices to support concurrent configuration by multiple clients. Consequently, some devices allow multiple clients to concurrently issue configuration commands to edit the candidate configuration. In other words, the management interface of such a device does not "lock" the candidate configuration of the device to a single client, i.e., reject configuration commands from other clients, but receives configuration commands from the multiple clients concurrently. Allowing multiple clients to configure the candidate configuration may become problematic during a restore of an archived configuration since the multiple clients may corrupt the archived configuration. Multiple clients may inadvertently alter the archived configuration prior to when the archived configuration becomes the operational configuration and in some instances corrupt the archived configuration. Upon becoming the operational configuration, the corrupt archived configuration may cause the router to become unreachable, inoperable, or both.

To further complicate the restoration process, one or more of the clients often establish sessions with the router via the management interface and remotely transmit configuration commands via the session. A loss of a client connection to the router, i.e., session failure, while restoring an archived configuration may also result in partial restoration or corruption of the operational configuration of the router.

In addition, an archived configuration may be corrupt or contain incorrect configuration data such that, upon restoration of the archived configuration, the router may become inoperable and unreachable by the one or more clients. Thus, routers supporting restoration of an archived configuration do not provide a reliable environment for restoration of an archived configuration, and do not ensure router functionality once the restoration is complete.

SUMMARY

In general, techniques are described for reliably restoring an archived configuration within a network device. More specifically, the techniques provide a reliable process detailing restoration of an archived configuration while avoiding many of the problems or challenges describe above.

In accordance with the techniques, a network device, such as router, first issues a lock configuration command to lock a candidate configuration prior to restoring an archived configuration. In particular, the router grants exclusive control over the candidate configuration to a system administrator or other client. In this manner, the router allows the client to access and modify the candidate configuration, but "locks" out other clients that may otherwise modify the candidate configuration. The lock configuration command may include a "failsafe" attribute that allows an automatic rollback command to be initiated in the event the restoration process terminates prior to commitment of the candidate configuration.

After locking the candidate configuration, the client directs the router to discard the entire candidate configuration, and replaces the candidate configuration with the archived configuration. For example, the router supports a load configuration command that includes an optional override attribute that directs the router to discard the entire candidate configuration and load the archived configuration in its place. Next, in response to a confirmed commit command, the router temporarily replaces an operational configuration with an archived configuration.

The confirmed commit command requires explicit confirmation by the client within a time period or the operational configuration is not updated. This may allow the router to recover from entering an unknown state in the event the archived configuration is corrupted, contains errors or incorrect configuration information, or otherwise renders the router inoperable and unreachable. In particular, the confirmed commit command causes the router to execute a rollback command in the event the configuration session fails, i.e., a confirmation is not received.

Next, integrity tests are performed to determine whether the router is inoperable, unreachable, and the like. In the event the router passes the integrity tests, a second commit command is issued to commit the changes made to the candidate configuration during restoration to the operational configuration. Finally, restoration is complete and the candidate configuration is unlocked, allowing other clients to edit the candidate configuration of the router.

An archive system may be used that allows the client to restore multiple network devices with corresponding archived configurations. The clients may interact with the archive system via a user interface to select one or more network devices and corresponding archived configurations. Upon selecting the one or more network devices and corresponding archived configurations, the clients may initiate the restoration process. The archived system then executes restoration process to ensure reliable restoration of each of the archived configurations.

In one embodiment, a method comprises locking candidate configuration data, wherein the candidate configuration data represents a working copy of operational configuration data, loading archived configuration data to replace the locked candidate configuration data, and committing the candidate configuration data to restore the archived configuration data as the operational configuration data.

In another embodiment, a device comprises memory to store operational configuration data and candidate configuration data, wherein the candidate configuration data represents a working copy of the operational configuration data. The device further comprises a control unit to lock the candidate configuration data, load archived configuration data to replace the locked candidate configuration data, and commit the candidate configuration data to restore the archived configuration data as the operational configuration data.

In another embodiment, a method comprises issuing a lock command to lock candidate configuration data, wherein the candidate configuration data represents a working copy of operational configuration data. The method further comprises issuing a load command to load archived configuration data to replace the locked candidate configuration data and issuing a commit command to commit the candidate configuration data to restore the archived configuration data as the operational configuration data.

In another embodiment, an archive system comprises a memory to store archived configuration data and a computing device to issue a lock command to lock candidate configuration data. The candidate configuration data represents a working copy of operational configuration data. The archive system issues a load command to load archived configuration data to replace the locked candidate configuration data, and issues a commit command to commit the candidate configuration data to restore the archived configuration data as the operational configuration data.

In another embodiment, a computer-readable medium comprising instructions. The instructions cause a programmable processor to lock candidate configuration data, wherein the candidate configuration data represents a working copy of operational configuration data. The instructions further comprise the programmable processor to load archived configuration data to replace the locked candidate configuration data and commit the candidate configuration data to restore the archived configuration data as the operational configuration data.

In another embodiment, a computer-readable medium comprises instructions that cause a programmable processor to issue a lock command to lock candidate configuration data, wherein the candidate configuration data represents a working copy of operational configuration data. The instructions further cause the processor to issue a load command to load archived configuration data to replace the locked candidate configuration data, and issue a commit command to commit the candidate configuration data to restore the archived configuration data as the operational configuration data.

The techniques may provide one or more advantages. Reliable restoration of an archived configuration may increase network efficiency. For example, an archived configuration may replace the candidate configuration. If the candidate configuration is left unlocked, many clients may edit the archived configuration without realizing the candidate configuration has been replaced. Thus, the archived configuration may become corrupt. A corrupt archived configuration may replace the operational configuration and cause the router to become inoperable and/or unreachable. An inoperable router may no longer forward network traffic causing significant delays throughout the network and decreasing efficiency. If however, the router locks the configuration, the archived configuration does not become corrupt and the router remains in operation. Moreover, confirming the archived configuration may determine whether the archived configuration is corrupt. Again this prevents the router from becoming inoperable, thus increasing efficiency.

Moreover, network efficiency is increased via the session failsafe. The session failsafe ensures that both the candidate and operational configurations are synchronized. This prevents the router from entering an unknown state, which again may be dangerous to the efficiency of the network. Finally, the archive system provides efficient network device restoration and further provides automation for ensuring the reliability of the restoration process. The archive system maintains control of the restoration process, thereby limiting client interaction and increasing the likeliness of a reliable restoration of an archived configuration.

The details of one or more embodiments of the invention are set forth in the accompanying drawings and the descrip-

DETAILED DESCRIPTION

Figure 1:
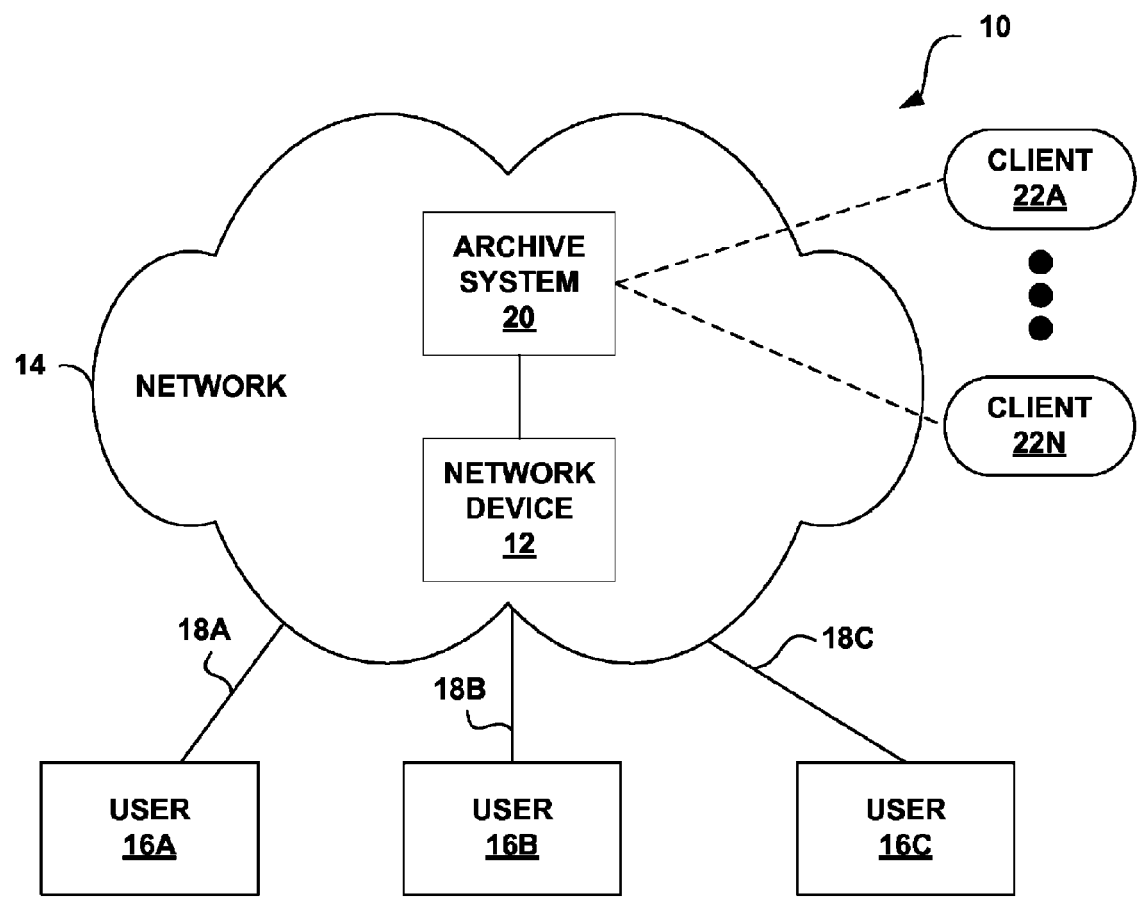
FIG. 1 is a block diagram illustrating an example computer network having a network device that supports reliable restoration of archived configurations consistent with the principles of the invention.

FIG. 1 is a block diagram illustrating an example computer network 10 in which network device 12 supports reliable restoration of archived configurations consistent with the principles of the invention. Computer network 10 comprises a network 14 that may be accessed by users 16A-16C (collectively, "users 16") via one of links 18A-18C (collectively, "links 18"). Each of users 16 represents an entity, such as an individual or an organization, that accesses network 14 to communicate with other users connected to network 14. Links 18 may be digital subscriber lines, cables, T1 lines, T3 lines, wireless or other network connections.

Network device 12 represents any device operating within computer network 10, such as a network hub, network switch, network router, or the like. Network device 12 provides an interface to archive system 20 that allows archive system 20 to configure network device 12. For example, network device 12 may be a network router, and archive system 20 may store archived configuration information that may be used to configure interface cards of the router, adjust parameters for the supported network protocols, specify the physical components within the routing device, modify the routing information maintained by the router, access software modules and other resources residing on the router, and the like.

Archive system 20 may include an interface, such as a web server, that presents a user interface with which clients 22A-22N (collectively, "clients 22") interact to restore and archived configurations. Archive system 20 may further include a database, or other data storage device to store the archived configurations. In addition, or alternatively, clients 22 may directly interact with network device 12 to perform these same operations, although this is not explicitly illustrated in FIG. 1.

Clients 22 interact with archive system 20 to archive an operational configuration of network device 12, i.e., a configuration currently in use by the network device. Accordingly, the archived configuration is a copy of the current operational configuration, and may be restored to quickly re-configure network device 12. Archive system 20 stores the archived configuration in the database or other data storage system for use at a later time. Clients 22 may interact with archive system 20 to specify an archive schedule detailing automated archival as well as encode comments to each archived configuration for ease of identification.

As described in detail, clients 22 may interact with archive system 20 to restore an archived configuration. Upon initiating the restoration, archive system 20 interacts, e.g., via automated scripts, with network device 12 to perform the restoration. Archive system 20 initiates the restoration process and submits the selected archived configuration to network device 12, e.g, by way of an application programming interface (API) presented by the network device. In response, network device 12 restores the archived configuration by replacing the operational configuration with the archived configuration in accordance with the techniques described herein. Once restoration is complete, network device 12 begins to operate in accordance with the specifications of the archived configuration.

As described in detail herein, network device 12 maintains a working copy, i.e., "candidate configuration," of a data source, i.e., the operational configuration. In accordance with the principles of the invention, network device 12 supports a command set that allows archive system 20 to issue a sequence of commands that reliably restores the archived configuration. To begin the restoration process, archive system 20 issues a lock-configuration command that directs network device 12 to grant the archive system exclusive access to the candidate configuration, i.e., lock the candidate configuration so that no other clients, such as other clients 22, may edit the candidate configuration. By locking the candidate configuration, network device 12 ensures that no clients edit the archived configuration and corrupt the restoration process. The lock configuration command may include an optional attribute, referred to herein as a "failsafe" attribute, that allows an automatic rollback command to be initiated in the event the restoration process terminates prior to commitment of the candidate configuration.

Next, archive system 20 issues a load configuration command that directs network device 12 to discard the entire candidate configuration and replace it with the archived configuration received from archive system 20. For example, the router may support a load configuration command that includes an optional override attribute that directs the router to discard the entire candidate configuration and load the achieve configuration in its place.

Archive system 20 then issues a confirmed commit command, which directs network device 12 to replace the operational configuration with the candidate configuration. The confirmed commit command requires explicit confirmation by the client within a time period or the operational configuration is not updated. Network device 12 automatically executes a rollback command in the event the configuration session fails, i.e., a confirmation is not received from archive system 20. This may allow the router to recover from entering an unknown state in the event the archived configuration is corrupted, contains errors or incorrect configuration information, or otherwise renders the router inoperable and unreachable. Upon completing the restoration, archive system 20 directs network device 12 to unlock the candidate configuration allowing clients to edit the candidate configuration.

Figure 2:
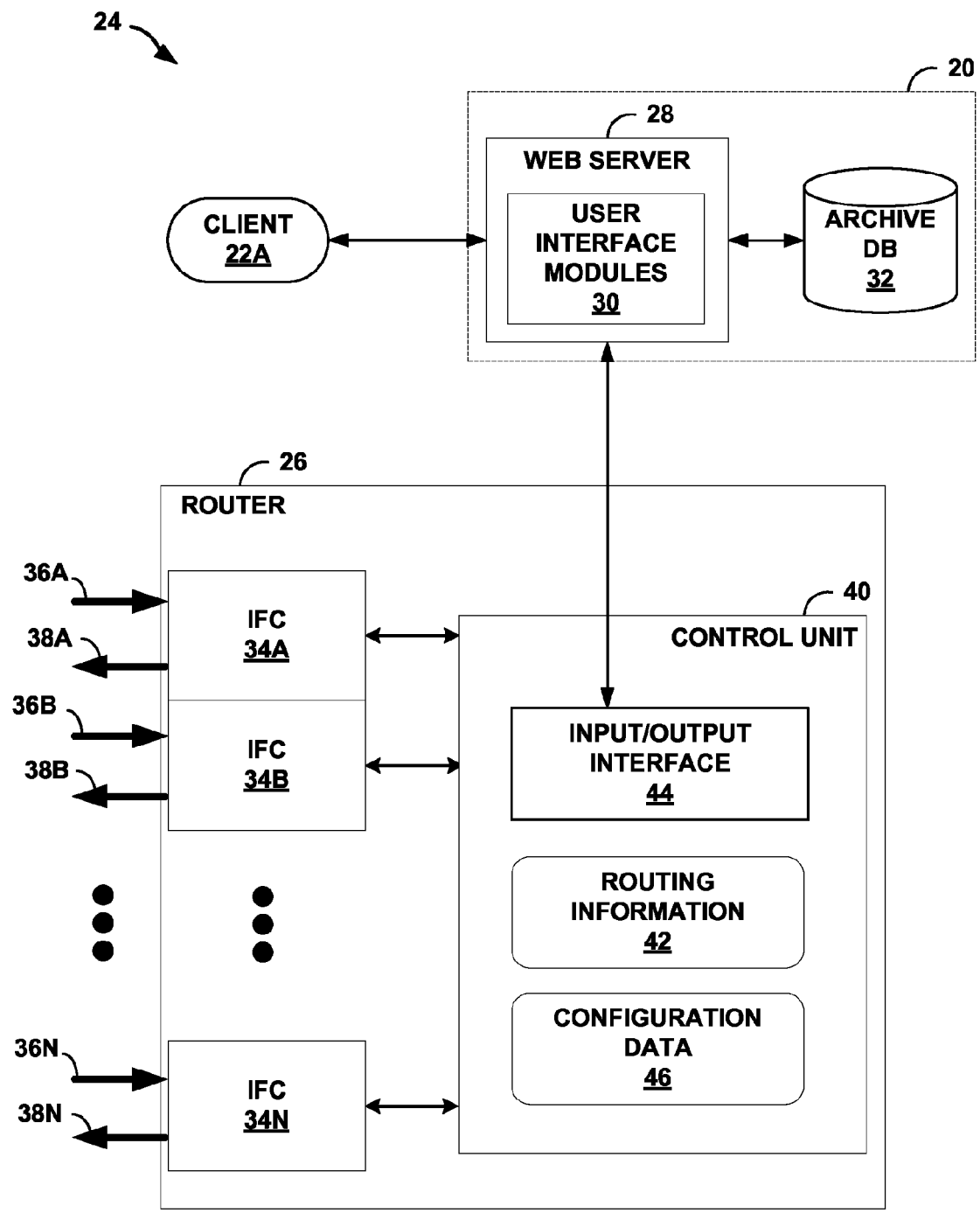
FIG. 2 is a block diagram illustrating an exemplary system consistent with the principles of the invention.

FIG. 2 is a block diagram illustrating an exemplary system 24 in which a router 26 supports a command set that provides a reliable environment for restoration of archived configurations consistent with the principles of the invention. In the example of FIG. 2, archive system 20 includes archive database (DB) 32 and web server 28, which serves user interface modules 30 to clients 22. Router 26 includes a set of one or more interface cards (IFCs) 34A-34N (collectively, "IFCs 34") that receive and send packets via network links 36A-36N and 38A-38N (collectively, "network links 36, 38"), respectively. IFCs 34 are typically coupled to network links 36, 38 via one or more interface ports (not shown in FIG. 2).

Router 26 further comprises a control unit 40 that maintains routing information 42. Routing information 42 describes the topology of network 14 and, in particular, routes through network 14. Routing information 42 may include, for example, route data that describes various routes within network 14, and corresponding next hop data indicating appropriate neighboring devices within network 14 for each of the routes. Control unit 40 periodically updates routing information 42 to accurately reflect the topology of network 14. In general, when router 26 receives a packet via inbound network link 36, control unit 40 forwards the packet on one or more of outbound network links 38, which may be based on a information included within the packet.

Control unit 40 receives configuration input from archive system 20 via an input/output (I/O) interface 44. I/O interface 44 may be a command line interface (CLI) or other suitable interface for processing user or script-driven commands. Control unit 40 stores the configuration input received from archive system 20 as configuration data 46, which may take the form of a text file, such as an ASCII file. Alternatively, control unit 40 may process the configuration input and store configuration data 46 in any one of a number of forms, such as one or more databases, tables, or other data structures. Configuration data 46 may include a candidate configuration and an operational configuration, as described above.

One of clients 22, e.g., client 22A, may comprise a user operating a computer executing a web browser. To initiate an archival action, e.g., archival or restoration of configuration data 46, client 22A accesses web server 28 via one or more user interfaces presented by user interface modules 30. By interacting with the one or more user interfaces, client 22A may elect to restore to router 26 an archived configuration from archive database 32. The one or more user interfaces may provide status information indicating the success or failure of the restoration of the archived configuration.

In the event that client 22A elects to restore an archived configuration on router 26, web server 28 receives a selection of an archived version, and initiates the reliable restoration process. Web server 28 accesses archive database 32 and retrieves an archived configuration in accordance with the selection. While gathering the archived configuration, web server 28 establishes a session with I/O interface 44. Upon establishing the session, web server 28 interacts with router 26 via I/O interface 44 to enable the restoration process.

To enable router 26 for the restoration process, web server 28 issues the lock-configuration command to lock the candidate configuration of configuration data 46 so that no other clients 22 may edit the candidate configuration. The lock prevents unwanted changes to the archived configuration once the archived configuration replaces the candidate configuration and protects the archived configuration from being corrupted. The lock configuration command may include a "failsafe" attribute that allows a first automatic rollback command to be initiated in the event the restoration process terminates prior to commitment of the candidate configuration.

After enabling the restoration process, web server 28 issues the load configuration command and transmits the archived configuration specified by client 22A to control unit 40 via I/O interface 44. Once control unit 40 receives the archived configuration, control unit 40 discards the entire candidate configuration of configuration data 46, and replaces it with the archived configuration received from web server 28. The load configuration command may include an "override" attribute that allows control unit 40 to discard the entire candidate configuration and replace it with the archived configuration.

Control unit 40 then confirms the integrity of the candidate configuration, i.e., the archived configuration. To confirm the integrity, web server 28 issues the confirmed commit command to control unit 40 via I/O interface 44. The confirmed commit command causes control unit 40 to temporarily replace the operational configuration of configuration data 46 with the candidate configuration. Moreover, the confirmed commit command requires explicit confirmation by the client within a time period or control unit 40 does not update the operational configuration of configuration data 46. Specifically, control unit 40 automatically executes a rollback command in the event the configuration session fails, i.e., a confirmation is not received from web server 28. In other words, any changes made to the candidate configuration are reversed so long as the changes are not "fully committed," meaning the changes are applied to the operational configuration and cannot be reversed.

Web server 28 then performs tests to determine whether the router is inoperable, unreachable, and the like. In the event the candidate configuration is corrupt, router 26 may become inoperable and/or unreachable posing serious problems for network 14 as network traffic may halt along routes serviced by router 26. In the event router 26 passes the integrity tests, web server 28 issues a second commit command to commit the changes made to the candidate configuration during restoration to the operational configuration. Web server 28 completes the restoration process by unlocking the candidate configuration allowing other clients 22 to edit the candidate configuration.

In this manner, router 26 supports a command set that provides reliable restoration of archived configurations. By first locking the candidate configuration, router 26 prevents clients 22 (FIG. 1) from corrupting or inadvertently editing the archived configuration during the restoration process. In particular, the lock prevents any of clients 22 other than archive system 20 from editing the archived configuration after the archived configuration replaces the candidate configuration. Furthermore, the use of the confirmed commit provides a session failsafe, i.e., the automatic execution of a rollback command that prevents a session failure between web server 28 and I/O interface 44 from leaving the candidate configuration in an unknown state. The rollback command returns the candidate configuration to a known state and ensures the candidate configuration is synchronous with the operational configuration. Finally, integrity testing prior to confirming the candidate configuration, i.e., archived configuration, protects against corrupted archived configurations that may cause router 26 to become inoperable, unreachable and the like.

Figure 3:
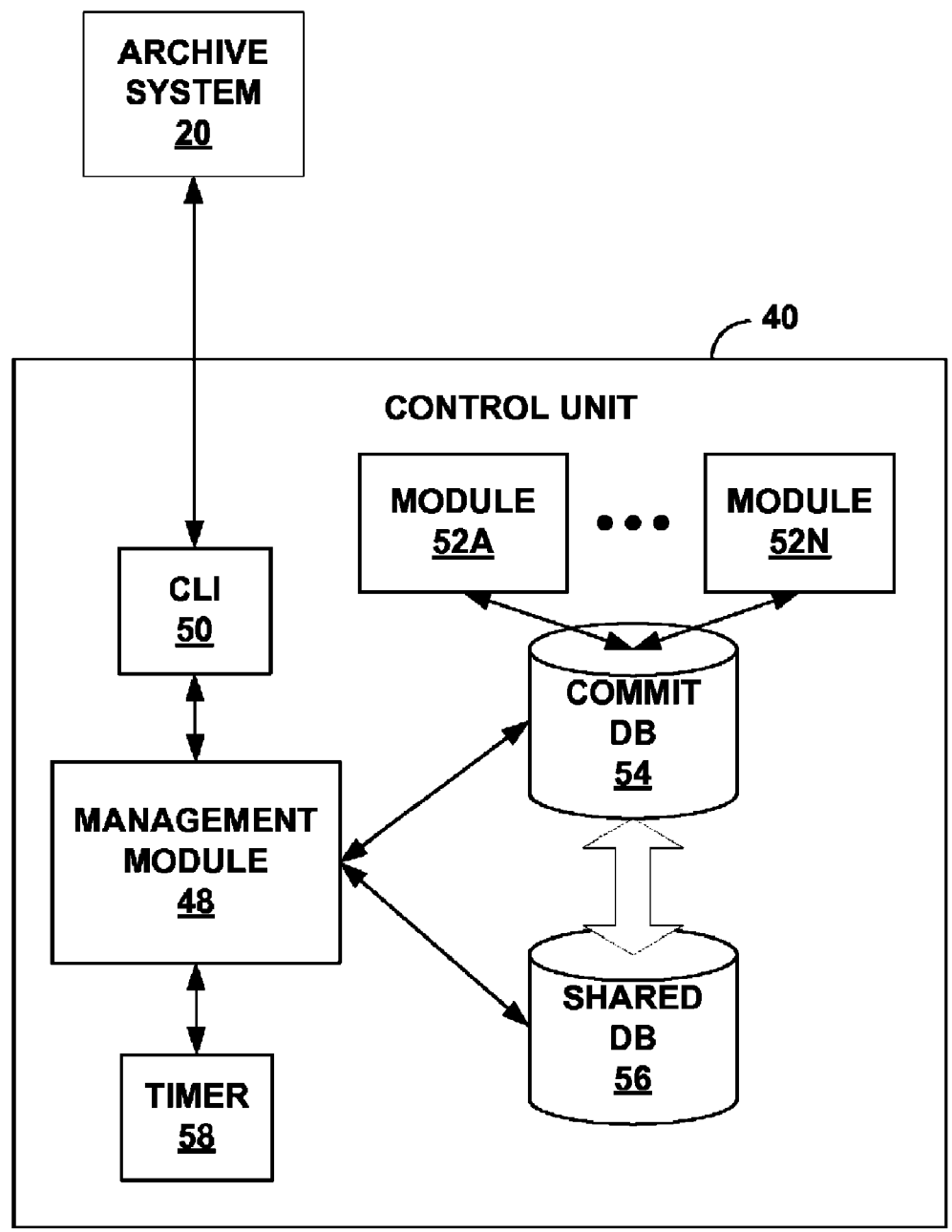
FIG. 3 is a block diagram illustrating an example control unit that supports reliable restoration of archived configurations consistent with the principles of the invention.

FIG. 3 is a block diagram illustrating an example embodiment of control unit 40 (FIG. 2). In the exemplary embodiment of FIG. 3, control unit 40 comprises management module 48 that communicates with archive system 20 via a command line interface (CLI) 50. CLI 50 serves as a daemon process that listens for requests from archive system 20 or other clients 22. Upon receiving a command or series of commands, e.g., an automated script, from archive system 20, CLI 50 relays the requests to management module 48. In some instances, CLI 50 may give way to direct communication between archive system 20 and management module 48.

Control unit 40 may further include one or more software modules 52A-52N (collectively, "software modules 52"). Software modules 52 represent threads of execution, and typically execute within an operating environment provided by an operating system. Software modules 52 may, for example, include a routing protocol module to administer protocols supported by router 26 (FIG. 2), a chassis module to account for the physical components of router 26, a device configuration module to control the physical configuration of router 26, or other software modules.

In addition, control module 40 includes a committed data source, referred to as committed database (COMMIT DB) 54, that stores an operational configuration of router 26. In other words, router 26 operates in accordance with configuration information stored in committed database 54. Control unit 40 further includes a shared data source referred to as shared database (SHARED DB) 56, that contains a copy of the configuration data of committed database 54, i.e., the candidate configuration, that is typically used for editing and modification without impacting operation of router 26. Archive system 20 accesses shared database 56 to restore an archived configuration stored on archive database 32 (FIG. 2) without immediately impacting the operation of router 26.

As described herein, archive system 20 begins the restoration process by locking the candidate configuration stored within shared database 56. Archive system 20 further activates the failsafe as described above to ensure synchronization between the candidate configuration and the operational configuration in the event the session terminates prior to commitment of the candidate configuration. Archive system 20, after enabling the restoration process, transmits the archived configuration to management module 48.

Upon receiving the archived configuration, management module 48 loads the archived configuration into shared database 56, replacing the candidate configuration with the archived configuration. In this manner, the archived configuration becomes the candidate configuration since the archived configuration becomes stored within shared database 56 at the memory location associated with the candidate configuration. The changes made to replace the candidate configuration with the archived configuration may be stored within shared database 56 until the changes are committed to committed database 54. In the event the failsafe is triggered, control unit 40 may perform changes to undo the stored changes, thus reverting the candidate configuration back to a state prior to the restoration process.

Upon loading the archived configuration, web server 28 issues a confirmed commit command to management module 48. Management module 48, in response to the confirmed commit command, loads a copy of the operational configuration into a temporary directory and merges the candidate configuration, i.e., the loaded archived configuration, with the operational configuration to generate a list of updated configuration objects. Management module 48 may arrange the list of updated configuration objects to form a configuration patch. Upon creating the configuration patch, management module 48 starts timer 58 and subsequently applies the configuration patch to the operational configuration stored in commit database 54. Router 26 operates in accordance to the new operational configuration as updated by the configuration patch.

Web server 28 begins to perform tests to determine whether router 26 is operational. In the event that router 26 becomes unreachable or inoperable due to the new operational configuration, management module 48 automatically restores the previous operational configuration to commit database 54 when timer 58 reaches a pre-set time limit. Management module 48 may restore the previous operation configuration by reversing the changes made by the configuration patch. However, in the event that router 26 successfully restores the archived configuration, i.e., the new operational configuration is not corrupt or erroneous, web server 28 issues a second commit command to management module 48. In response, management module 48 stops timer 58 and makes permanent the changes to the operational configuration. In this manner, the confirmed commit command enables router 26 and web server 28 to verify the archived configuration prior to permanently committing the archived configuration. Moreover, the confirmed commit command allows router 26 to recover in the event the archived configuration is corrupt.

Figure 4:
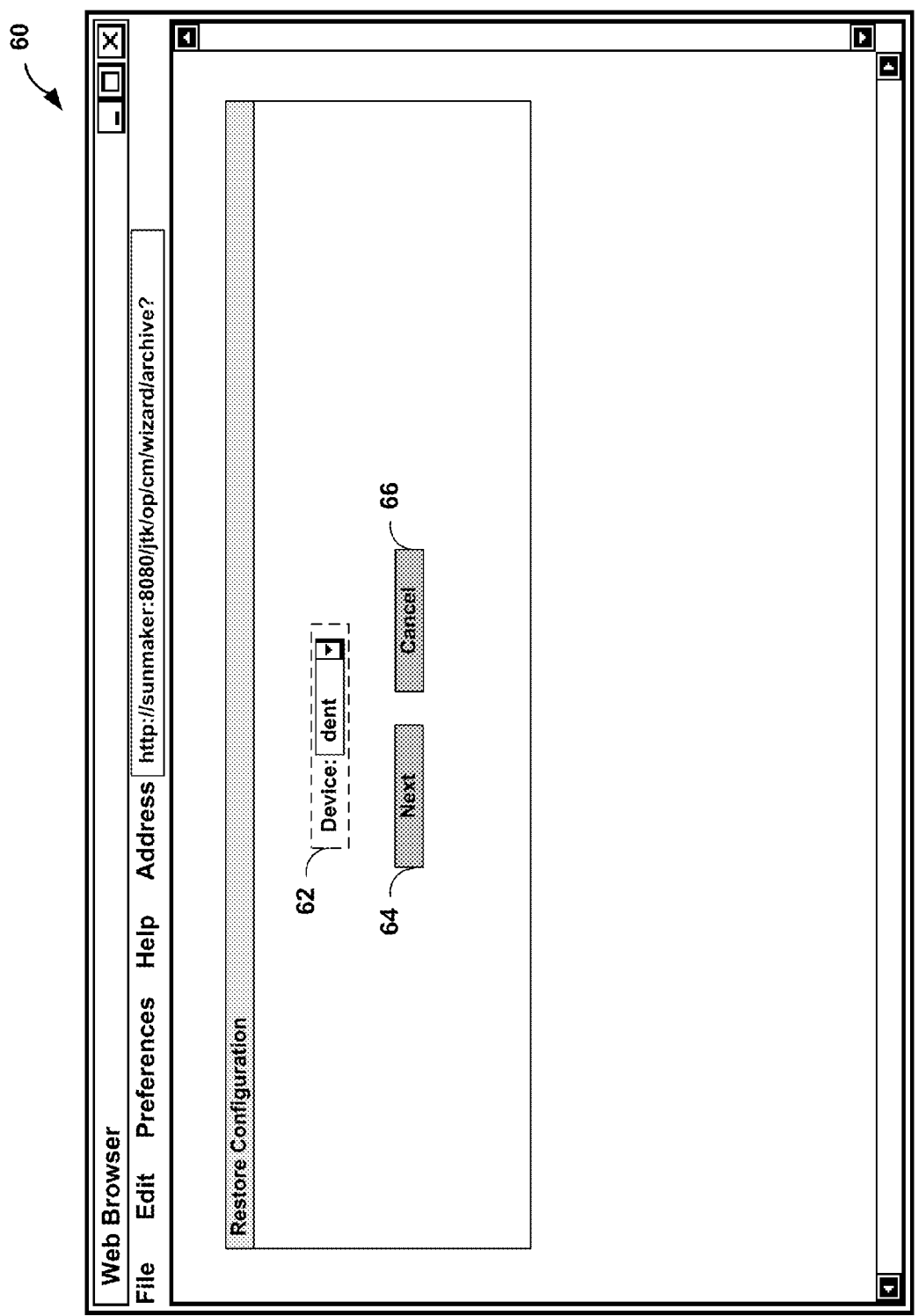
FIG. 4 is an example user interface presented by user interface modules for selecting a device to restore an archived configuration in accordance with the principles of the invention.

FIG. 4 is an example user interface 60 presented by user interface modules 30 for selecting a device to restore an archived configuration in accordance with the principles of the invention. In the illustrated embodiment, user interface 60 provides device selector 62, next action input 64, and cancel action input 66. Device selector 62 may comprise, as shown, a pull down menu or other selection mechanism, such as check boxes, input fields, and buttons.

Client 22A (FIG. 2) interacts with user interface 60 to select a device. Via interactions with device selector 62, client 22A restores an archived configuration to the selected device. As shown in the illustrated embodiment by the device name "Dent," client 22A may select a device in accordance with a stored name or label. User interface 60 may include other selectors that allow one of clients 22 to select a device. For example, client 22A may enter an identification number into an input field to select a device. Consequently, the invention is not limited to selection via a pull down menu of a device by name. Furthermore, user interface 60 may include multiple device selectors similar to device selector 62 for automatic restoration to multiple devices with corresponding archived configurations.

Client 22A selects next action input 64 to finalize the device selected in device selector 62. Client 22A may instead exit user interface 60 without initiating restoration of any device by selecting cancel action input 66. In the event client 22A selects next action input 64, web server 28 analyzes the input received via user interface 60 and, more specifically, input received via device selector 62. Web server 28 then accesses archived configurations stored within archive database 32 to determine whether archived configurations exist for the selected devices. Alternatively, web server 28 may determine which devices have associated archived configurations and only permit client 22A to select devices having at least one associated archived configuration. In any event, web server 28 may present, in response to selection of next action input 64 and cancel action input 66, further user interfaces of user interfaces 30 to client 22A, as illustrated in the following figures.

Figure 5:
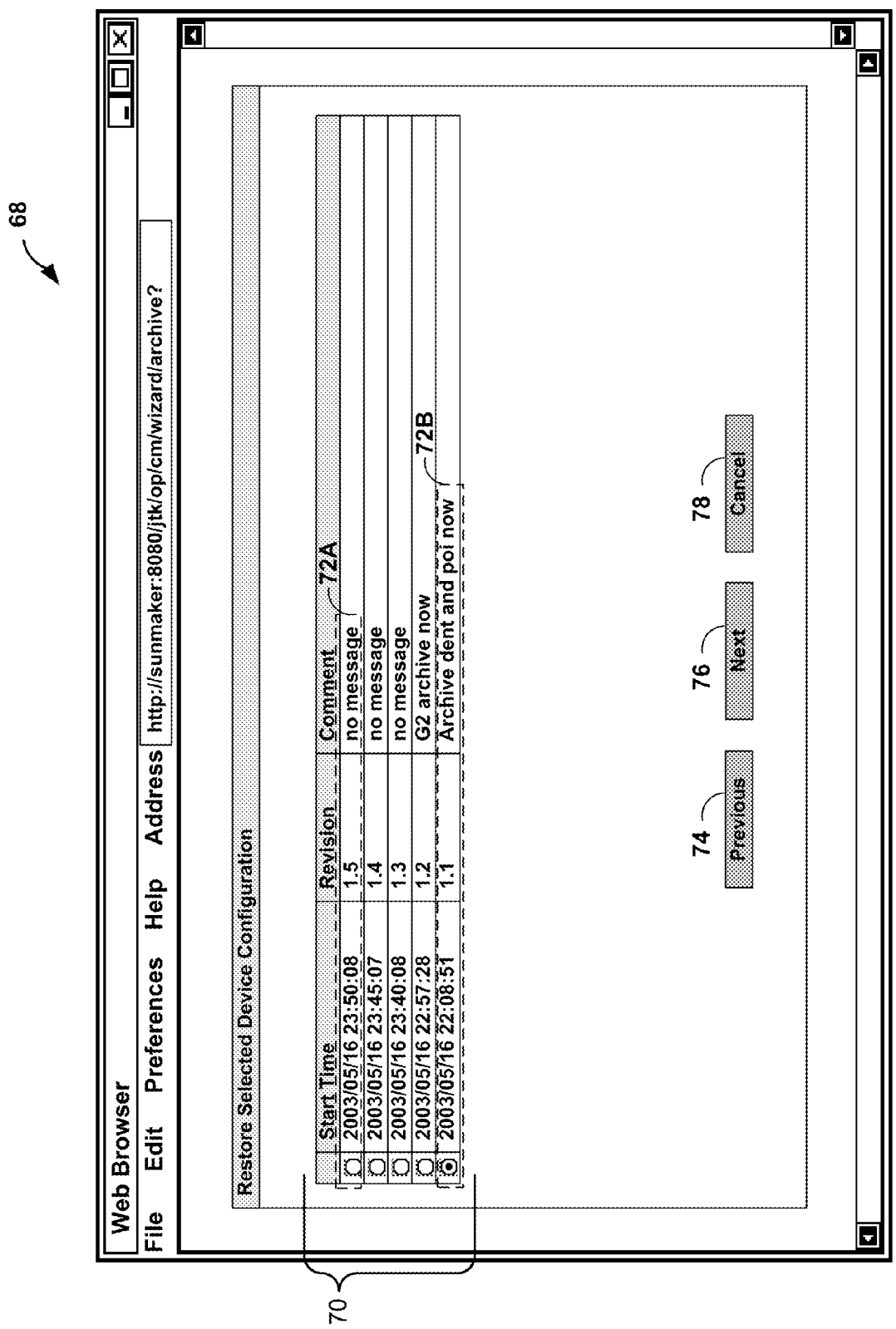
FIG. 5 is another example user interface presented by user interface modules for selecting an archived configuration in accordance with the principles of the invention.

FIG. 5 is an example user interface 68 presented by user interface modules 30 for selecting an archived configuration once a target device has been selected. For example, web server 28 may present user interface 68 in response to input by client 22A to user interface 60. Specifically, web server 28 presents user interface 68 in response to selection of next action input 64 by client 22A. Furthermore, client 22A, for purposes of illustration, selected a device named "Dent" for restoration.

User interface 68 includes a table 70, and previous, next and cancel action inputs 74, 76, and 78, respectively. Table 70 may include any number of rows and columns, and lists a set of archived configurations, i.e., different versions of archived configuration for the selected device. Within each row of table 70, client 22A may select an archived configuration by selecting a radio button located on the far left column of the table. Exemplary rows 72A and 72B illustrate an unselected row and a selected row, respectively. Table 70 further includes start time, revision and comment columns from left to right in FIG. 5.

Client 22A may analyze each row to identify an archived configuration, and may select any of the rows included within table 70. The start time, revision and comment columns may aid client 22A in selecting an archived configuration. Upon selecting a row the radio button may become active, as shown by row 72B.

Once client 22A selects a desired archived configuration, client 22A may then select one of action inputs 74, 76 and 78. In the event client 22A selects previous action input 74, web server 28 presents the previous user interface, i.e., user interface 60 of FIG. 4. Previous action input 74 allows client 22A to return to user interface 60 to reconfigure the device selection. In other words, client 22A may select previous action input 74 to change which device undergoes restoration of an archived configuration. Client 22A, as described below, may select cancel action input 78 to exit user interface 68 without initiating the restoration of an archived configuration.

In the event client 22A selects next action input 76, web server 28 receives the selection of row 72B and parses the selection to determine the selected archived configuration. Web server 28 accesses archive database 32 and reads the selected archived configuration from archive database 32. Web server 28 then performs the operations discussed above to restore the selected archived configuration to the selected device named "Dent."

Figure 6:
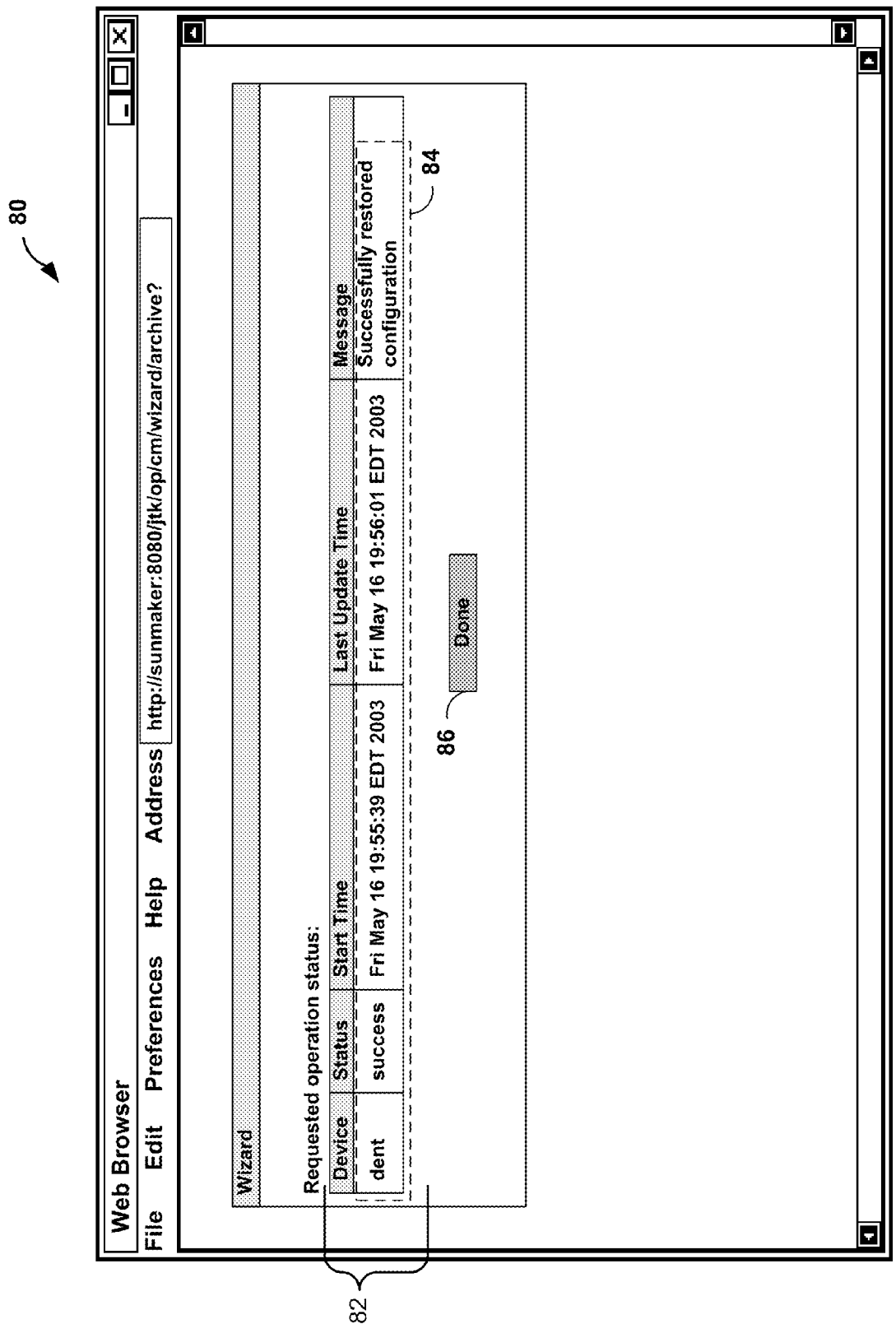
FIG. 6 is another example user interface presented by user interface modules for displaying a status of a device undergoing restoration in accordance with the principles of the invention.

FIG. 6 is another example user interface 80 presented by user interface modules 30 for displaying a status of a device to which an archived configuration is being restored. In particular, web server 28 may present user interface 80 in response to input by client 22A to user interface 68 (FIG. 5). Specifically, web server 28 presents user interface 80 in response to selection of one of the rows of table 70, such as row 72B, and next action input 76.

User interface 80 includes a table 82 having a single row 84 and a done action input 86. User interface 80 presents row 84 of table 82 in order to display the success or failure of the restoration of the selected archived configuration to the selected device. As shown in FIG. 6, row 84 displays information describing a device name, a status of restoration to the device name, a start time of the restoration, a last update time to the device, and a message. In particular, row 84 describes restoration of the previously selected archived configuration to the "dent" device. Further, the status of the restoration is "success" indicating that the "dent" device successfully restored the selected archived configuration. The "success" status indicates that the "dent" device did not trigger the failsafe, and did not become inoperable or unreachable. Also, the message included within row 84 indicates a "successfully restored configuration."

Web server 28 interacts with management module 48 via CLI 50 to obtain status information and generate row 84 of table 82. Web server 28, throughout the course of the restoration process, may query management module 48 to learn the status of the restoration process. Web server 28 may dynamically update the status shown in user interface 80 upon learning the status of the restoration process from management module 48.

Client 22A may view user interface 80 to inquire as to the status of the restoration process. Moreover, client 22A may view user interface 80 to troubleshoot any unsuccessful restorations. When client 22A has finished viewing user interface 80, client 22A may select done action input 86.

Figure 7:
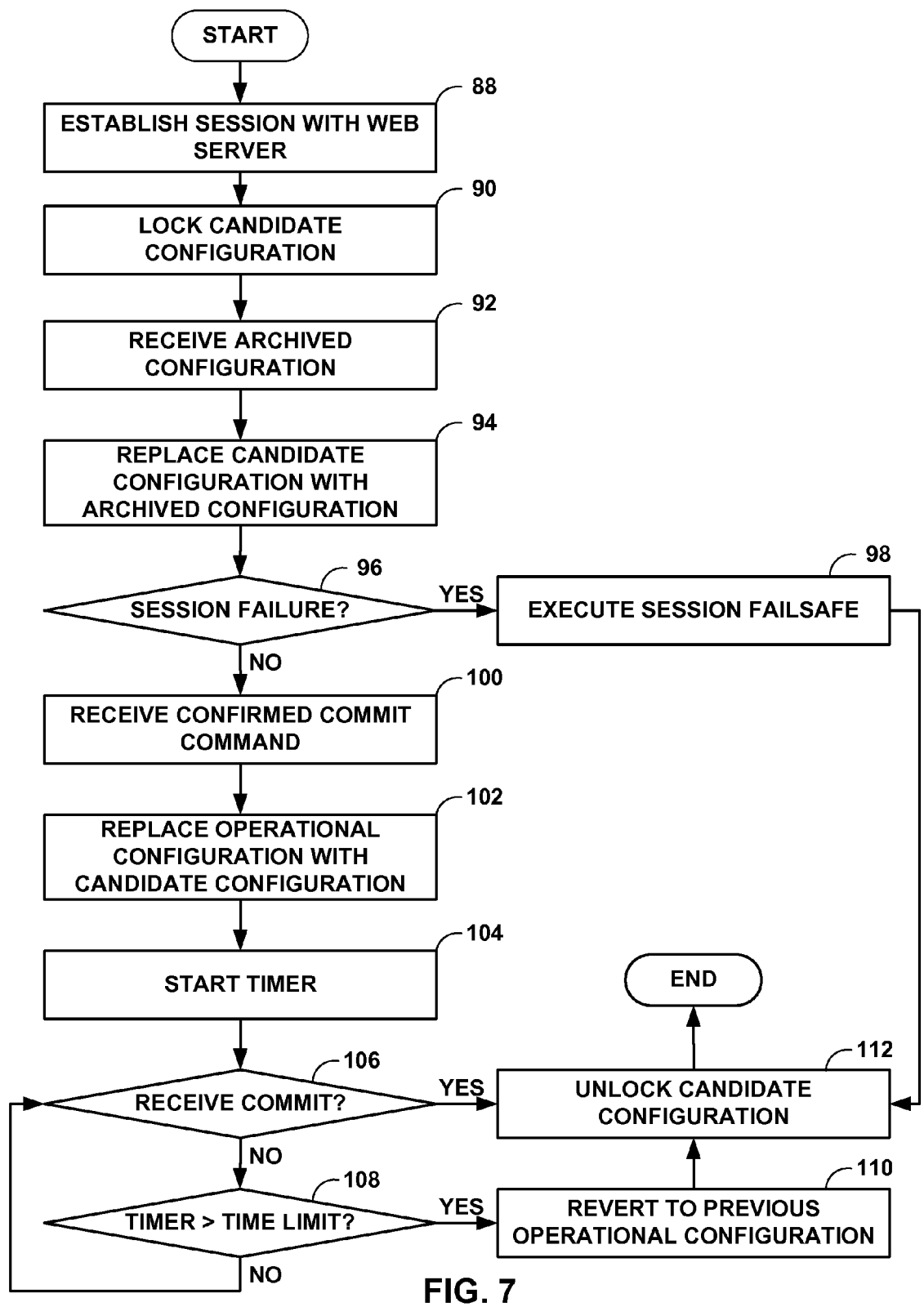
FIG. 7 is a flowchart illustrating example operation of a router reliably restoring an archived configuration in accordance with the principles of the invention.

FIG. 7 is a flowchart illustrating example operation of a network device, e.g., router 26 of FIG. 2, reliably restoring an archived configuration in accordance with the principles of the invention. Initially, web server 28 establishes a session with control unit 40 via CLI 50 to interact with management module 48 (88). Once the session is established, control unit 40 (FIG. 3) locks a candidate configuration stored within shared database 56 (90).

In some embodiments, web server 28 (FIG. 2) issues a lock command to cause control unit 40 to lock the candidate configuration. The lock configuration command may include a "failsafe" attribute that allows an automatic rollback command to be initiated in the event the restoration process terminates prior to commitment of the candidate configuration. Alternatively, control unit 40 may automatically lock the candidate configuration upon receiving an archived configuration. The following pseudocode illustrates an exemplary lock configuration command issued by web server 28 in accordance with syntax supported by control unit 40.

```
<rpc>
  <lock-configuration>
    <rollback>automatic</rollback>
  </lock-configuration>
</rpc>
```

In this example, the <rollback> tag is used to enable the failsafe attribute of the restoration session, which allows an automatic rollback command to be initiated in the event the restoration process terminates prior to commitment of the candidate configuration.

After locking the candidate configuration, control unit 40 replaces the candidate configuration with the archived configuration (94). In particular, web server 28 transmits an archived configuration selected by one of clients 22. In some embodiments, web server 28 issues a load configuration command that includes an optional override attribute that directs the router to discard the entire candidate configuration and load the achieved configuration in its place. The following pseudocode illustrates an exemplary load configuration command issued by web server 28 in accordance with a syntax supported by control unit 40.

```
<rpc>
  <load-configuration action="override" url="/tmp/new.conf">
</rpc>
```

In this example, the override attribute has been set, and a universal resource locator (URL) has been provided to point to the archived configuration being restored. In response to the command, control unit replaces the candidate configuration in its entirety with the archived configuration, and retains the locked properties, as discussed above, of the candidate configuration.

If, prior to commitment of the candidate configuration, control unit 40 determines that the session has failed, e.g., due to a network error (96), the control unit executes a session failsafe, e.g., automatic execution of a rollback command (98). The rollback command causes control unit 40 to undo the changes made when the archived configuration replaced the candidate configuration. The session failsafe allows control unit 40 to maintain synchronized candidate and operational configurations, thus preventing either configuration from entering an unknown state. In the event the session remains functional, web server 28 transmits a confirmed commit command.

Upon receiving the confirmed commit command (100), control unit 40 replaces the operational configuration with the candidate configuration, i.e., the archived configuration (102). In particular, management module 48 may create a temporary directory and copy the operational configuration stored in commit database 54 to the temporary directory. Next, management module 48 merges the candidate configuration with the copy of the operational configuration to generate a list of updated configuration objects. Management module 48 generates a configuration patch from the list of updated configuration objects and applies the patch to the operational configuration stored in commit database 54. Once the patch is applied, management module 48 starts timer 58 (104).

After issuing the confirmed commit command, web server 28 performs tests on router 26 to determine whether router 26 is still operational after applying the configuration patch. Meanwhile, control unit 40 waits to receive a commit command from web server 28 (106). In the event control unit 40 does not receive a commit command, management module 48 compares timer 58 to a pre-set time limit (108). Control unit 40 continues to wait for the commit command as long as timer 58 is less than the time limit ("NO" branch). However, in the event that timer 58 exceeds the time limit, management module 48 reverts the operational configuration back to the previous operational configuration (110). In other words, management module 48 undoes the effects of the configuration patch and further may undo the changes to the candidate configuration during the restoration process.

The results of the tests performed by web server 28 determine whether web server 28 issues the commit command. In the event the archived configuration is corrupt and causes router 26 to become inoperable, web server 28 is usually unable to issue the commit command to router 26. However, if router 26 is operational and the network is not adversely affected, web server 28 transmits the commit command to router 26. The commit command stops timer 58 and permanently replaces the operational configuration with the candidate configuration, i.e., the archived configuration.

In any of the above events, such as executing the session failsafe, reverting to the previous operational configuration and successful restoration of the archived configuration, control unit 40 unlocks the candidate configuration (112). In this manner, router 26 provides a command set that may be utilized to reliably restore an archived configuration.

Figure 8:
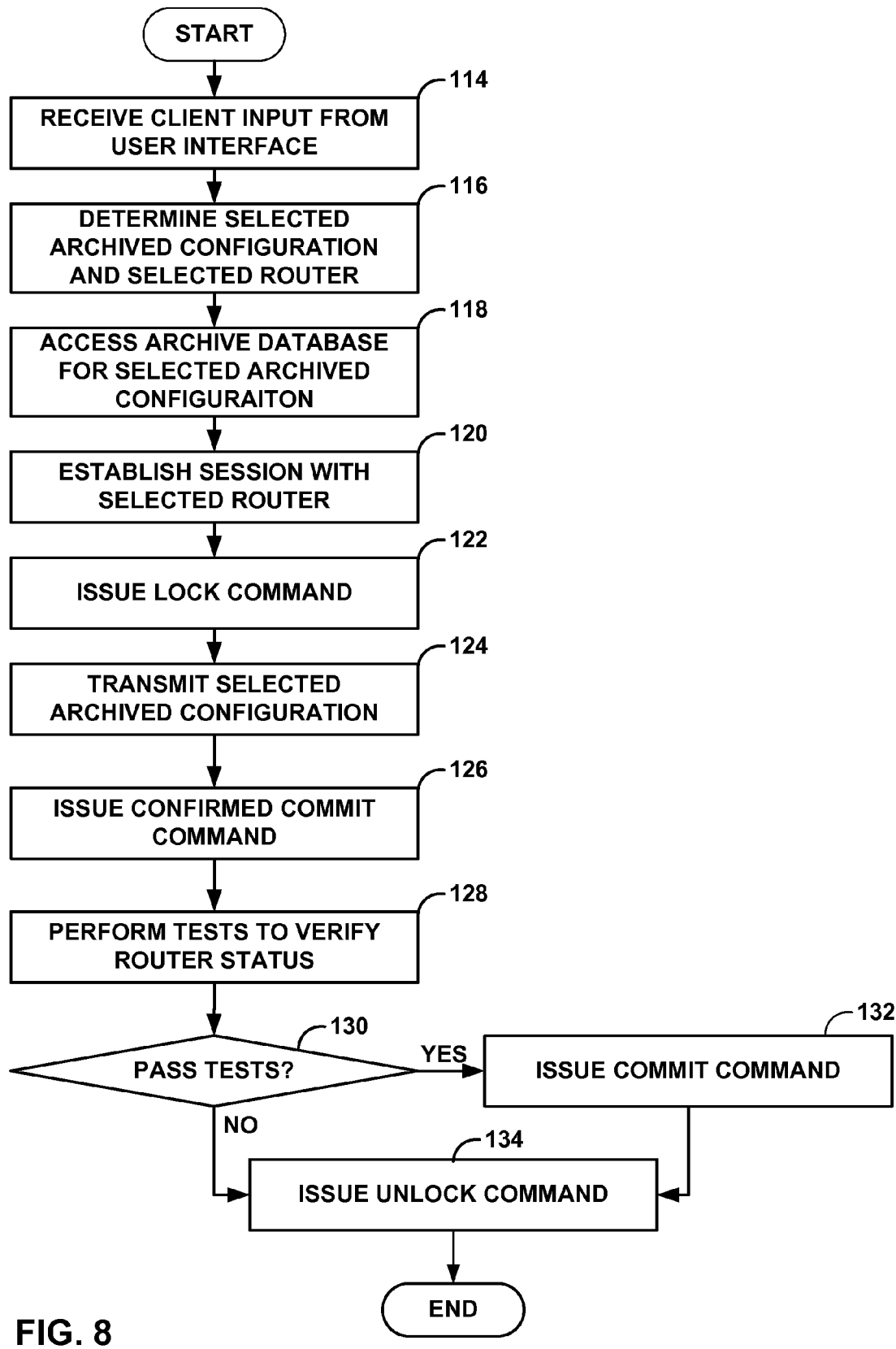
FIG. 8 is a flowchart illustrating example operation of a web server initiating reliable restoration of an archived configuration in accordance with the principles of the invention.

FIG. 8 is a flowchart illustrating example operation of a client device, e.g., web server 28, initiating reliable restoration of an archived configuration in accordance with the principles of the invention. Initially, one of clients 22 interact with web server 28 via a user interface, such as user interfaces 60 and 68 (FIGS. 5 and 6), to select a device and a version of the archived configuration. Web server 28 receives the input (114), and determines the selected archived configuration and the selected device, e.g., router 26 (116).

After determining the selected archived configuration and the selected network device, web server 28 accesses archive database 32 to retrieve the selected archived configuration (118). Web server 28 also establishes a session with the selected router 26 (120). Upon establishing a session web server 28 may issue a lock command (122). In some embodiments, web server 28 may not issue a lock command as router 26 may automatically lock the candidate configuration upon receiving the archived configuration. In any event, web server 28 transmits the archived configuration to router 26 via the established session, e.g., by issuing the load configuration command (124). Web server 28 may receive status confirming that the archived configuration successfully replaces the candidate configuration. Once the candidate configuration has been replaced, web server 28 issues a confirmed commit command to router 26 (126), and performs tests to verify the status and general operation of router 26 (128). Router 26, as discussed above, may become unreachable and/or inoperable when the candidate configuration, i.e., the selected archived configuration, is committed. Web server 28 performs tests to determine whether router 26 is still reachable.

In the event router 26 passes the tests (130), web server 28 issues a second commit command to router 26. The commit command as discussed above permanently restores the selected archived configuration in place of the operational configuration. In the event that router 26 does not pass the tests (130), web server 28 may wait until router 26 undoes the changes made to the operation configuration. In any event, web server 28 issues an unlock command to unlock the candidate configuration (134).

Various embodiments of the invention have been described. While these embodiments are described above in the context of a network device, the principles of the invention as broadly claimed herein may apply to any device, devices or systems undergoing restoration of an archived configuration. For example, in one embodiment, an archive system may restore an archived configuration to a device, such as a computer, in accordance with the principles of the invention. Thus, the embodiments as discussed above should be considered exemplary embodiment and not limit the scope of the invention. These and other embodiments are within the scope of the following claims.

The invention claimed is:

1. A method comprising:

establishing, with a network device, a communication session with a client;

receiving, with the network device, a lock command from the client via the communication session;

locking candidate configuration data in response to the lock command from the client to grant an archive system exclusive access to the candidate configuration data of the network device so that no other clients can edit the candidate configuration data, wherein the candidate configuration data represents an editable working copy of current operational configuration data of the network device;

after locking the candidate configuration data, receiving a load command from the client and, in response to the load command, loading, from the archive system, archived configuration data that represents previous operational configuration data of the network device to replace the locked candidate configuration data;

in response to a first commit command from the client, temporarily committing the candidate configuration data to temporarily restore the archived configuration data as the operational configuration data of the network device by creating a temporary copy of the candidate configuration data, merging the operational configuration data into the temporary copy to generate a configuration patch that lists any differences between the candidate configuration data and the operational configuration data, and applying the configuration patch to the operational configuration data to update the operational configuration data in accordance with the differences;

upon temporarily committing the candidate configuration data, enabling a timer within the network device;

responding to integrity tests from the client to confirm that the network device is reachable and did not fail due to temporarily committing the candidate configuration data to the operational configuration data;

upon receiving a second commit command from the client prior to the timer exceeding a pre-set time limit, permanently committing the candidate configuration data to restore the archived configuration data as the operational configuration data of the network device; and upon expiration of the timer without receiving the second commit command with the network device, executing a first rollback to undo any changes to the operational data from the archived configuration data as loaded into the candidate configuration data.

2. The method of claim 1, further comprising, upon failure of the communication session prior to receiving the second commit command, executing a second rollback to undo any changes made to the candidate configuration data by the archived configuration data to ensure the candidate configuration is synchronous with the operational configuration of the network device.

3. The method of claim 1,
wherein the load command comprises an override attribute; and
wherein loading the archived configuration data in response to receiving the load command includes discarding the entire candidate configuration and replacing the discarded candidate configuration data with the archived configuration data in response to the override attribute of the load command.

4. The method of claim 1, further comprising, after successfully permanently committing the candidate configuration data in response to receiving the second commit command prior to the timer exceeding the pre-set limit, unlocking the candidate configuration data.

5. The method of claim 4, wherein unlocking the candidate configuration data occurs in response to receiving an unlock command after receiving the second commit command.

6. The method of claim 4, wherein locking candidate configuration data permits only a single client to edit the candidate configuration data and unlocking the candidate configuration data allows one or more clients to simultaneously edit the candidate configuration data.

7. A device comprising:
memory to store current operational configuration data and candidate configuration data, wherein the candidate configuration data represents an editable working copy of the current operational configuration data;
a timer;
a control unit;
a control unit configured to establish a communication session with a client and present a user interface to the client for modifying the operational configuration data via the communication session, the user interface configured to support a first commit command that requires explicit confirmation by a second commit command from the client within a time period; and
wherein, upon receiving a lock command from the client, the control unit is configured to lock the candidate configuration data and grant an archive system exclusive access to the candidate configuration data, wherein the candidate configuration data represents an editable working copy of current operational configuration data;
wherein, upon receiving a load command from the client, the control unit is configured to load from the archive system archived configuration data that represents previous operational configuration data to replace the locked candidate configuration data;
wherein, in response to the first commit command from the client, the control unit is configured to temporarily commit the candidate configuration data to temporarily restore the archived configuration data as the operational configuration data by creating a temporary copy of the candidate configuration data, merging the operational configuration data into the temporary copy to generate a configuration patch that lists any differences between the candidate configuration data and the operational configuration data, and applying the configuration patch to the operational configuration data to update the operational configuration data in accordance with the differences;
wherein, upon temporarily committing the candidate configuration data, the control unit enables the timer;
wherein the control unit is configured to respond to integrity tests from the client to confirm that the device is operational and did not fail due to temporarily committing the candidate configuration data to the operational configuration data;
wherein, in response to receiving the second commit command from the client prior to the timer exceeding a pre-set time limit, the control unit is configured to permanently commit the candidate configuration data to restore the archived configuration data as the operational configuration data; and
wherein, upon expiration of the timer without receiving the second commit command from the client, the control unit is configured to execute a first rollback to undo any changes to the operational data from the archived configuration data as loaded into the candidate configuration data.

8. The device of claim 7, wherein, upon failure of the communication session prior to receiving the second commit command, the control unit is configured to execute a second rollback to undo any changes made to the candidate configuration data by the archived configuration data to ensure the candidate configuration is synchronous with the operational configuration of the network device.

9. The device of claim 7,
wherein the load command comprises an override attribute; and
wherein the control unit discards the entire candidate configuration and replace the discarded candidate configuration data with the archived configuration data when the override attribute is enabled.

10. The device of claim 7, further comprising the control unit configured to unlock the candidate configuration data after successfully permanently committing the candidate configuration data in response to receiving the second commit command prior to the timer exceeding the pre-set limit.

11. The device of claim 10, wherein the control unit unlocks the candidate configuration data in response to receiving an unlock command after receiving the second commit command.

12. The device of claim 10, wherein locking candidate configuration data permits only a single client to edit the candidate configuration data and unlocking the candidate configuration data allows one or more clients to simultaneously edit the candidate configuration data.

13. An archive system comprising:
a memory to store archived configuration data that represents previous operational configuration data of a network device; and a computing device configured to establish a communication session from the archive system to a network device to be configured, wherein the computing device of the archive system is configured to issue a lock command from the archive system to the network device via the communication session to request exclusive access to the candidate configuration data of the network device and lock the candidate configuration so that no other clients can edit the candidate configuration data, wherein the candidate configuration data represents an editable working copy of current operational configuration data of the network device;

wherein the computing device is configured to issue a load command to the network device to load the archived configuration data that represents previous operational configuration data of the network device to replace the locked candidate configuration data;

wherein the computing device is configured to issue a first commit command to the network device to instruct the network device to commit the candidate configuration data to temporarily restore the archived configuration data as the operational configuration data of the network device for only a pre-set time limit by creating a temporary copy of the candidate configuration data, merging the operational configuration data into the temporary copy to generate a configuration patch that lists any differences between the candidate configuration data and the operational configuration data, and applying the configuration patch to the operational configuration data to update the operational configuration data in accordance with the differences;

wherein the computing device of the archive system is configured to perform integrity tests on the network device after issuing the first commit command to assess a state of one or more devices, and selectively issue the second commit command based on the assessed state of the network device; and wherein the computing device is configured to, when the network device is operable based on the assessed state of the network device, issue a second commit command within the pre-set time limit to permanently commit the candidate configuration data as the operational configuration data of the network device.

* * * * *